United States Patent [19]
Nakayama et al.

[11] Patent Number: 5,083,631
[45] Date of Patent: Jan. 28, 1992

[54] SLIP CONTROL APPARATUS FOR A FOUR WHEEL DRIVE VEHICLE

[75] Inventors: Yasunari Nakayama; Kazutoshi Nobumoto; Kaoru Sotoyama; Mitsuru Nagaoka; Kenichi Watanabe, all of Hiroshima, Japan

[73] Assignee: Mazda Motor Corporation, Hiroshima, Japan

[21] Appl. No.: 409,388

[22] Filed: Sep. 19, 1989

[30] Foreign Application Priority Data

Sep. 19, 1988 [JP] Japan ................................. 63-23460

[51] Int. Cl.$^5$ ............................................. B60K 17/00
[52] U.S. Cl. ................................. 180/197; 303/100; 364/426.03; 364/426.02
[58] Field of Search ............... 180/197; 364/426.02, 364/426.03; 303/100

[56] References Cited

U.S. PATENT DOCUMENTS

| | | | |
|---|---|---|---|
| 4,809,183 | 2/1989 | Eckert | 364/426.02 |
| 4,866,623 | 9/1989 | Ise et al. | 180/197 |
| 4,981,190 | 1/1991 | Nakayama et al. | 180/197 |

FOREIGN PATENT DOCUMENTS 60-248440 12/1985 Japan.
61-268529 11/1986 Japan.
63-41245 2/1988 Japan.

*Primary Examiner*—Mitchell J. Hill
*Attorney, Agent, or Firm*—Fish & Richardson

[57] ABSTRACT

Disclosed is a four wheel drive vehicle with four wheels drivable, which is provided with a first slip control apparatus for reducing a driving force to the wheels by operating a brake mounted on each of the wheels and with a second slip control apparatus for reducing a driving force to the wheels by reducing the engine output. Operation of only the first slip control apparatus or both the first and second slip control apparatuses is selectively carried out in accordance with the number of wheels which are detected to be slipping in an amount greater than a given degree of slippage. Particularly when such slipping wheels are two, the slip control is conducted by operating only the first slip control apparatus or both the first and second slip control apparatuses in accordance with control modes predetermined on the basis of six combinations in which such two slipping wheels out of the four wheels are combined with each other.

30 Claims, 11 Drawing Sheets

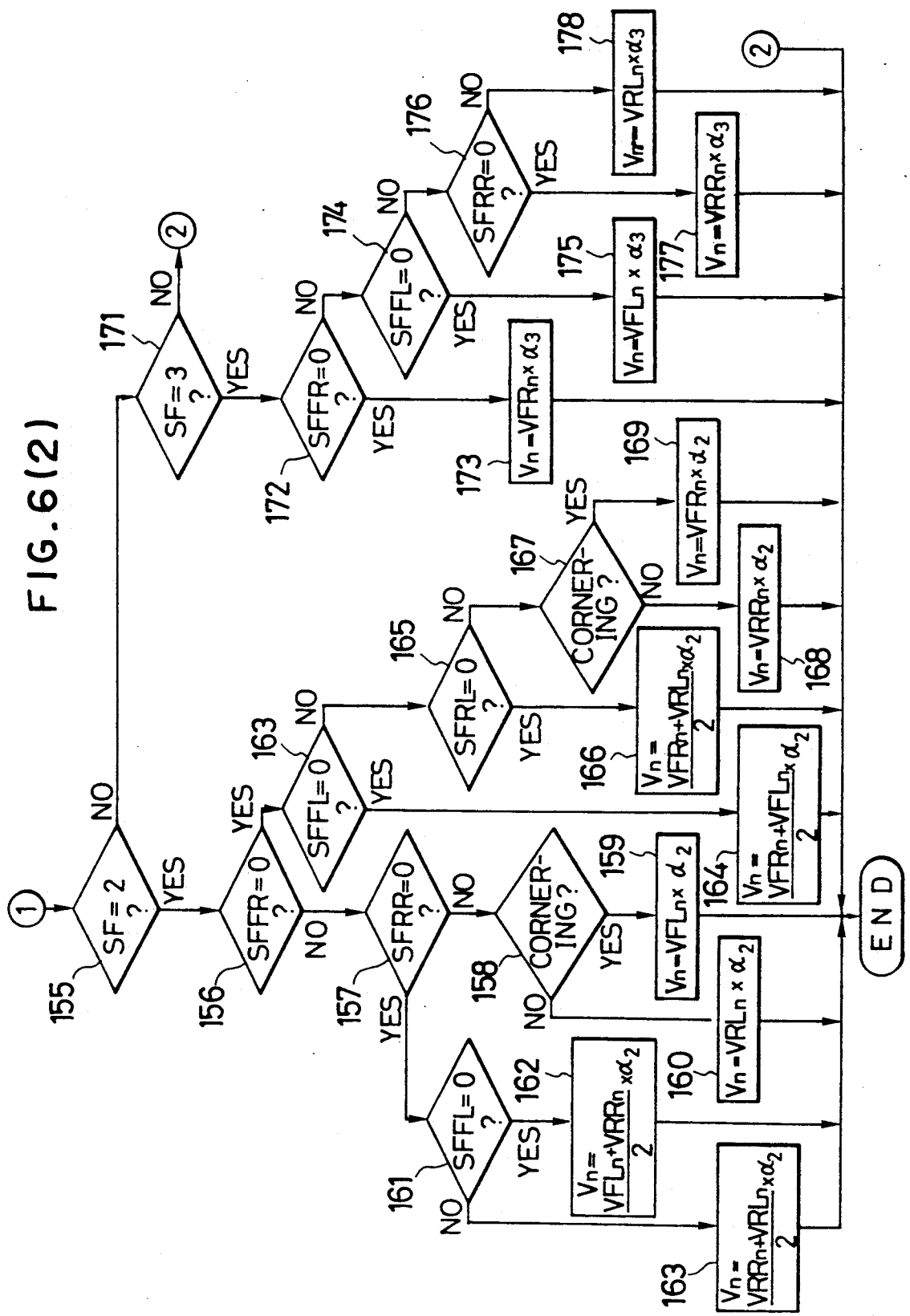

5,083,631

SLIP CONTROL APPARATUS FOR A FOUR WHEEL DRIVE VEHICLE

BACKGROUND OF THE INVENTION

1. Field of the Invention

The present invention relates to a slip control apparatus for a four wheel drive vehicle and, more particularly, to a slip control apparatus for a four wheel drive vehicle in which a slip on each of the wheels on pavement can be controlled.

2. Description of Related Art

When wheels of vehicles, as automobiles, slip on pavement in a large degree of slippage during running, they cannot grip the pavement so that appropriate running characteristics cannot be achieved. Accordingly, in order to control a slip of the driven wheels on pavement, a slip control apparatuses are known which can operate a brake unit installed in the vehicle or which can reduce output of the engine.

In controlling the slip of the driven wheels on pavement by such slip control apparatuses, it is required to detect a degree of slippage of the driven wheel on pavement greater than a given value or to detect a vehicle velocity in order to set a target circumferential velocity or a slip ratio of the driven wheels slipping on pavement in a degree of slippage greater than a given value. In a two wheel drive vehicle in which only the front wheels or the rear wheels are driven, it is relatively easy to detect a vehicle velocity on the basis of a circumferential velocity, namely, a rotational velocity, of undriven wheels which are generally less frequent to slip on pavement. However, a four wheel drive vehicle is another story because its four wheels are all driven and there is no such undriven wheel.

In order to overcome the difficulties with which such a four wheel drive vehicle encounters, Japanese Patent Publication (Kokai) No. 289,429/1987 proposes a slip control apparatus for a four wheel drive vehicle, in which a vehicle velocity is estimated on the basis of the least circumferential acceleration out of the circumferential acceleration of the four wheels while a slip of each of the wheels in an excessive degree of slippage on pavement is detected on the basis of the circumferential acceleration.

In such a conventional slip control apparatus for the four wheel drive vehicle, however, the engine output is controlled to be reduced, on top of control over operation of a brake unit, only when all the driven wheels slip in an excessive degree of slippage on pavement because this adversely affects a running stability of the vehicle to a great extent. When three driven wheels or less are slipping in such an excessive degree of slippage on pavement, an application of a braking force by the brake unit to such slipping wheels is controlled in order not to reduce driving characteristics such as acceleration, running performance on rough road and so on, while no control is made for reducing the engine output which serves as reducing the driving force of the vehicle to a remarkable extent.

It is considered, however, that even when three wheels or less of the four wheel drive vehicle are slipping in such an excessive degree of slippage on pavement, the output of an engine is controlled to be reduced, in addition to control over operation of a braking unit, in order to ensure a stable running performance in accordance with running states of the vehicle. In this case, there is the opportunity that driving characteristics be reduced to an extreme extent by having the driving torque acting upon the wheels reduced to an extent more than necessary.

In particular, when two of the wheels slip in an amount greater than a given value, it should be noted that a degree of adverse reactions upon the running stability of the vehicle varies to a great extent with a combination of two wheels slipping out of six combinations in which the two of the four wheels are combined with each other. Thus it is desired that a slip control be done while the combination of the two wheels slipping to a degree greater than the given value is taken into consideration, in order to ensure the running stability of the vehicle as well as to control a reduction in the driving characteristics of the vehicle. For a four wheel drive vehicle, for instance, when the front and rear wheels on the left-hand side or on the right-hand side are slipping in an amount of slippage above the given value on pavement, an application of the breaking force by the brake unit to such slipping wheels may make a difference between the driving torque acting upon the slipping wheels and the driving torque acting upon the corresponding non-slipping wheels too large, thereby incurring the risk of causing a yawning that is not desired for the running stability. As another example, when the left-hand and right-hand front wheels in the four wheel drive vehicle are slipping in such an excessive amount, an application of the braking force by the brake unit to those front wheels increases torque to be transmitted to the left-hand and right-hand rear wheels so that it causes the tendency the vehicle is oversteered. In this instance, if the engine output would be reduced, the driving torque to all the wheels would be caused to be reduced controlling a decrease in the running stability of the vehicle. Conventional four wheel drive vehicles, however, are provided with no slip control apparatus which enables a slip control by taking into account a combination out of six combinations of two wheels which are slipping in an amount greater than the given value.

SUMMARY OF THE INVENTION

Therefore, the present invention has the object to provide a slip control apparatus for a four wheel drive vehicle, which enables an optimized slip control in accordance with the number of wheels which are slipping in an excessive amount.

The present invention has another object to provide a slip control apparatus for a four wheel drive vehicle, which optimizes a slip control particularly when two of the four wheels are slipping in an excessive amount.

In order to achieve the object, the present invention consists of a slip control apparatus for a four wheel drive vehicle in which each of wheels consisting of left-hand front and right-hand front wheels and left-hand and right-hand rear wheels is driven, comprising:

slippage detecting means for detecting a magnitude of slippage on pavement for each of the wheels, which is greater than a given degree of slippage;

brake means for applying a braking force individually to each of the wheels;

output adjusting means for adjusting output of an engine for driving each of the wheels; and control means for reducing a driving torque acting upon a slipping wheel on the basis of one of control modes predetermined so as to operate which means out of the brake means and the output adjusting means in accordance with the number of the slipping wheel or wheels which is or are detected by the slippage detecting means to be slipping in a degree of slippage greater than the given value;

wherein the control means is to selectively carry out a first control mode in which only the brake control is executed or a second control mode in which both the brake means and the output adjusting means are executed.

In order to achieve another object, the present invention consists of a slip control apparatus for a four wheel drive vehicle in which each of wheels consisting of left-hand front and right-hand front wheels and left-hand and right-hand rear wheels is driven, comprising:

slippage detecting means for detecting a slippage amount on pavement for each of the wheels;

brake means for applying a braking force individually to each of the wheels;

output adjusting means for adjusting output of an engine for driving each of the wheels;

judgment means for judging a combination of two slipping wheels out of four wheels, which are detected by the slippage detecting means as slipping in a degree of slippage above the given value; and a control means for reducing torque for driving the two of the wheels in accordance with one of control modes on the basis of a judgment result by the judgment means, a control mode being preset so as to operate which means out of the brake means and the output adjusting means in association with the combination of the two wheels.

Other objects, features and advantages of the present invention will become apparent in the course of the description of the preferred embodiments which follows, with reference to the accompanying drawings.

DETAILED DESCRIPTION OF THE PREFERRED EMBODIMENTS

The present invention will be described in more detail by way of examples with reference to the accompanying drawings.

OVERALL STRUCTURE

Figure 1:
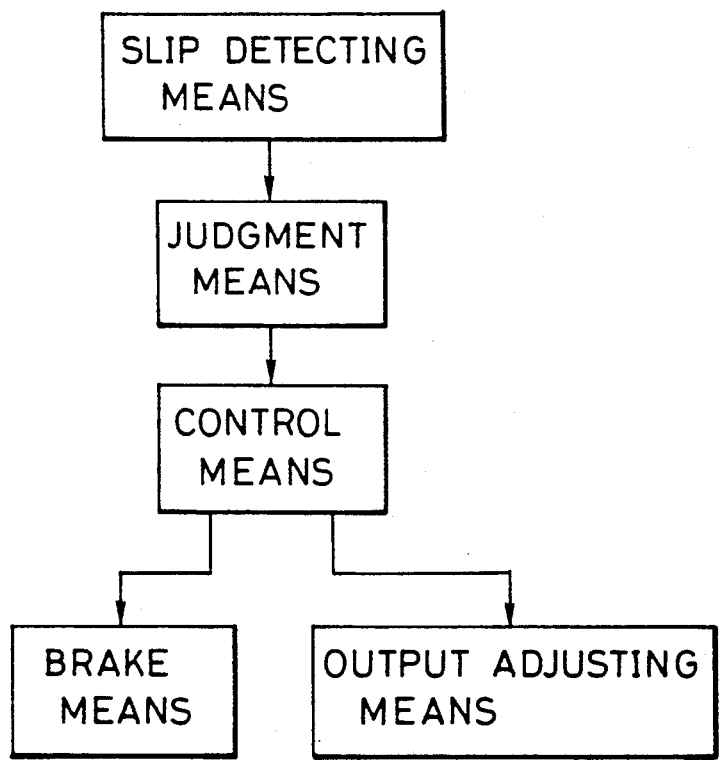
FIG. 1 illustrates a basic structure of the slip control apparatus for a four wheel drive vehicle according to the present invention.
Figure 2:
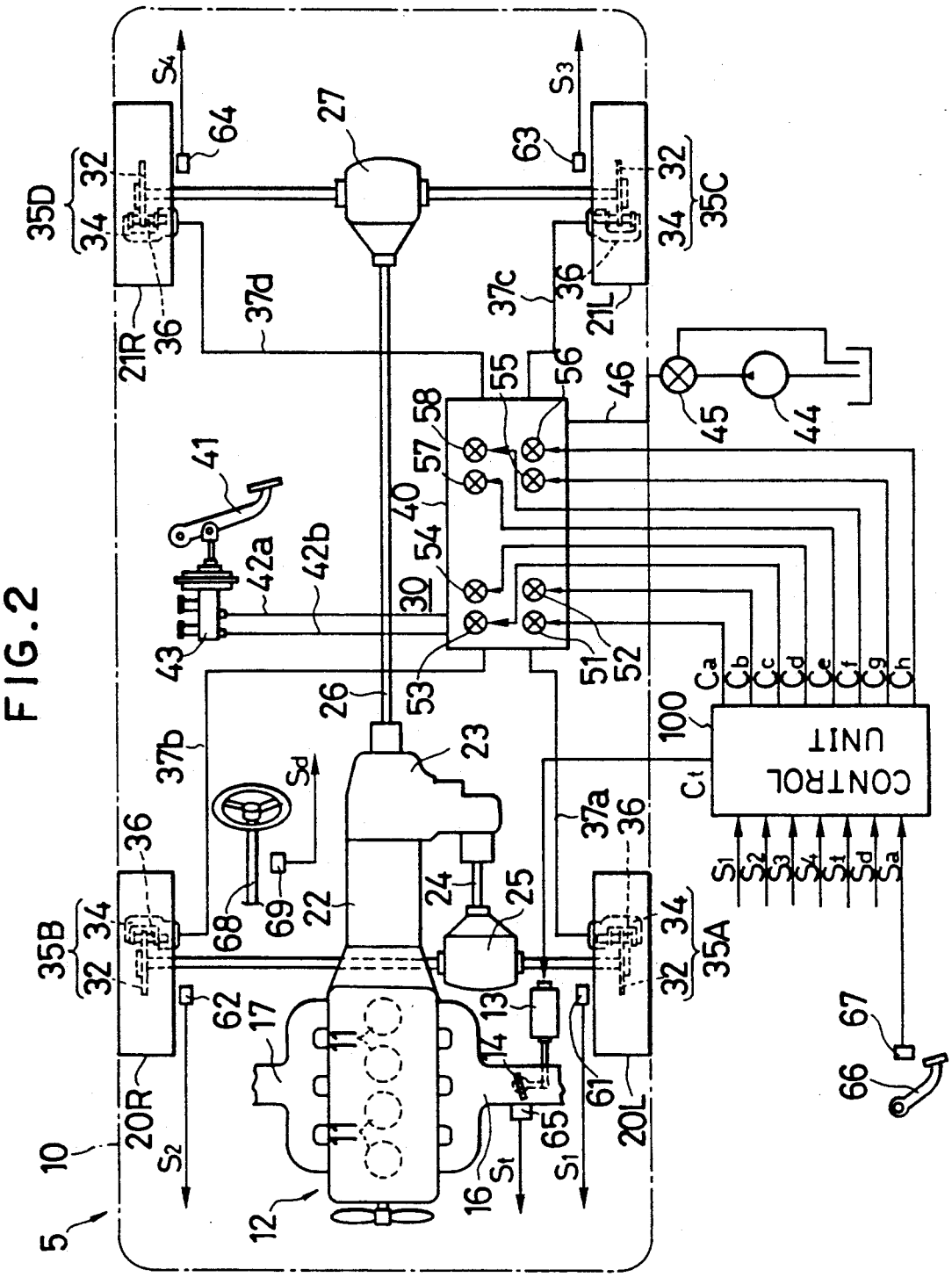
FIG. 2 is a schematic representation of the slip control apparatus according to one example of the present invention.

FIG. 2 is a schematic representation showing one example of the slip control apparatus for a four wheel drive vehicle according to the present invention, together with the vehicle to which the slip control apparatus is applied.

As shown in FIG. 2, a vehicle 5 may be of a four wheel drive type and an engine 12 may be loaded at a forward portion of the vehicle body 10. The engine 12 may be provided with four cylinders to each of which air is fed through an air intake passage 16 with a throttle valve 14 drivable to be opened or closed by a throttle actuator 13, together with a fuel to be fed from a fuel feed system. A mixed gas fed to each cylinder 11 is burned by operation of a spark system and then withdrawn from an exhaust passage 17. Burning the mixed gas permits revolving the engine 12 generating torque which is transmitted to each of a left-hand front wheel 20L and a right-hand front wheel 20R as well as a left-hand rear wheel 21L and a right-hand rear wheel 21R through a torque transmitting passage system comprising a transmission 22, a center differential mechanism 23, a propeller shaft 24 and a front-wheel differential mechanism 25, as well as a propeller shaft 26 and a rear-wheel differential mechanism 27.

A brake unit 30 is disposed in association with the left-hand and right-hand front wheels 20L and 20R as well as the left-hand and right-hand rear wheels 21L and 21R. The brake unit 30 comprises disk brakes 35A, 35B, 35C and 35D each of which contains a disk 32 mounted, respectively, to the left-hand front wheel 20L, the right-hand front wheel 20R, the left-hand rear wheel 21L and the right-hand rear wheel 21R, and a caliper 34 to which is mounted a brake pad 32 pressing the corresponding disk 32. The caliper 34 of each of the disk brakes 35A to 35D is provided with a wheel cylinder 36 to which is connected each of respective conduits 37a, 37b, 37c and 37d extending from a liquid pressure adjusting unit 40. Each of the calipers 34 presses the brake pad to the respective disk 32 by means of a pressing force in proportion to braking liquid pressures to be fed through each of the respective conduits 37a to 37c from the liquid pressure adjusting unit 40 to the corresponding wheel cylinder 36, thereby braking the left-hand and right-hand front wheels 20L and 20R as well as the left-hand and right-hand rear wheels 21L and 21R.

The liquid pressure adjusting unit 40 is supplied with liquid pressures in proportion to operation of pressing a brake pedal 41 through conduits 42a and 42b from a power cylinder 43 mounted to the brake pedal 41 as well as with operating liquid pressures generated by a pump 44 and a pressure governing valve 45 through a conduit 46. The liquid pressure adjusting unit 40 generates braking liquid pressures in proportion to the operation of pressing the brake pedal 41 during the ordinary braking where no slip control is carried, on the one hand, the braking liquid pressures being fed to the disk brakes 35A to 35D through the respective conduits 37a to 37d. The liquid pressure adjusting unit 40 individually generates braking liquid pressure in proportion to the operation of electromagnetic valves 51 to 58, inclusive, thus enabling a selective supply to the corresponding disk brakes 35A to 35D during the slip control being under way, on the other hand.

The electromagnetic valves 51 to 58 are grouped into sets of electromagnetic valves 51 and 52, 53 and 54, 55 and 56, as well as 57 and 58. The sets are disposed so as to adjust the braking liquid pressures to the disk brakes 35A to 35D mounted, respectively, to the left-hand and right-hand front wheels 20L and 20R as well as the left-hand and right-hand rear wheels 21L and 21R. For instance, when ones of the electromagnetic valves in each set, i.e., valves 51, 53, 55 and 57, are open, on the one hand, and the others thereof, i.e., valves 52, 54, 56 and 58, are closed, on the other, the braking liquid pressures to be fed to the disk brakes 35A to 35D are being increased. When the ones of the electromagnetic valves in each set, namely, valves 51, 53, 55 and 57, are closed and the others thereof, namely, valves 52, 54, 56 and 58, are open, the braking liquid pressures to be fed to the disk brakes 35A to 35D are being decreased. When all the valves in each set are closed, the braking liquid pressures to be fed to the disk brakes 35A to 35D are retained at a state as they are.

In addition to the above arrangement, a control unit 100 is disposed for controlling the opening and closing of the electromagnetic valves 51 to 58, inclusive, and for controlling the operation of the throttle actuator 13. To the control unit 100 are fed signals S1 to S4, inclusive, in proportion to the circumferential velocities of the left-hand and right-hand front wheels 20L and 20R as well as the left-hand and right-hand rear wheels 21L and 21R, respectively, from velocity sensors 61 to 64 mounted in association with the respective wheels 20L, 20R, 21L and 21R, a signal St in proportion to a throttle opening angle from a throttle opening sensor 65 disposed in association with the throttle valve 14, a signal Sa in proportion to a pressed amount of an accelerator pedal 66 from an accelerator opening sensor 67 disposed in association with the accelerator pedal 66, and a signal Sd in proportion to steered angles of the left-hand and right-hand front wheels 20L and 20R from a steered angle sensor 69 disposed in association with a steering wheel 68.

The control unit 100 is designed such that the signals S1 to S4 are inputted at given cycles, an estimated vehicle velocity is computed on the basis of the signals S1 to S4, inclusive, representing respectively circumferential velocities and circumferential acceleration of the left-hand and right-hand front wheels 20L and 20R and the left-hand and right-hand rear wheels 21L and 21R, and each of the circumferential acceleration computed for the wheels is then compared with a given value Aa in order to judge whether or not each of the wheels 20L, 20R, 21L and 21R slips in an amount of slippage exceeding a given value. When it is judged that at least one of the circumferential velocities of the wheels 20L, 20R, 21L and 21R is greater than the given value Aa, it is determined that the slip occurs in an amount beyond the given value and a slip control is carried out. When it is judged that each of the circumferential velocities thereof is smaller than the given value Aa, an ordinary throttle opening control is carried out.

In carrying out the ordinary throttle opening control by the control unit 100, an ordinary target throttle opening angle is set in accordance with a pressing amount of the accelerator pedal 66 represented by the signal Sa, a signal Ct for driving the throttle valve 14 is formed in accordance with a difference an ordinary target throttle opening angle and an opening angle of the throttle valve 14 represented by the signal St so as to allow the opening angle of the throttle valve 14 to approach to the ordinary target throttle opening angle, and the driving signal St is then fed to the throttle actuator 13. This signal allows the throttle actuator 13 to drive the throttle valve 14 to open or close so as to agree its opening angle with the ordinary target throttle valve opening angle. It is noted that the ordinary target throttle opening increases in proportion in a given relationship to the pressing amount of the accelerator pedal 66.

Upon carrying out the slip control, the control unit 100 detects which wheel is and how many wheels are slipping in an amount of slippage beyond the given value on pavement on the basis of each of the circumferential acceleration of the left-hand and right-hand front wheels 20L and 20R as well as the left-hand and right-hand rear wheels 21L and 21R. When it is detected that plural wheels are slipping in an excessive amount, it is further detected how many wheels are slipping at approximately the same time in a degree of slippage beyond the given value. On the basis of the wheels detected as being slipping in such a degree, the number of the slipping wheels, and the number of the slipping wheels which are further slipping at substantially the same time in a degree of slippage above the given value, an estimated vehicle velocity to be used for setting a target slip ratio is computed and a mode of slip control is set.

ESTIMATE OF VEHICLE VELOCITY

In setting the estimated vehicle velocity by the control unit 100, the smallest circumferential velocity of those of the left-hand and right-hand front wheels 20L, 20R, and the left-hand and right-hand rear wheels 21L, 21R is multiplied by a given correction coefficient $\alpha$ o ($<1$) to give an estimated vehicle velocity Vn at the time during the period of high running wherein an estimated velocity $Vn-1$ (n being a positive integer), which is computed on the basis of the circumferential velocities of the wheels 20L, 20R, 21L and 21R represented by the signals S1 to S4 inputted one cycle before, is equal to or greater than a given value Vh, and during the period of low speed straight-forward running wherein the estimated vehicle velocity $Vn-1$ is lower than the given value Vh and steered angles of the left-hand front wheel 20L and the right-hand front wheel 20R expressed by the signal Sd are smaller than a given value $\theta$ a. During the period of low speed cornering wherein the estimated vehicle velocity $Vn-1$ is smaller than the value Vh and steered angles of the left-hand front wheel 20L and the right-hand front wheel 20R are equal to or greater than the given value $\theta$ a, an estimated vehicle velocity is set at different modes on the basis of the circumferential velocity or velocities of the wheel or wheels which is or are not slipping at a degree of slippage greater than the given value on pavement in accordance with the location of the slipping wheel and the number of the slipping wheels detected.

In setting the estimated vehicle velocity during the period of low speed cornering, if both the left-hand front wheel 20L and the right-hand rear wheel 21R are not slipping, on the one hand, when the vehicle 5 is detected to be cornering to the left on the basis of the steered angles of the left-hand front wheel 20L and the right-hand front wheel 20R on condition that the slipping wheel detected is zero or 1, a mean value of the circumferential velocity of the left-hand front wheel 20L and that of the right-hand rear wheel 21R is multiplied by a predetermined correction coefficient $\alpha$ 1 to produce an estimated vehicle velocity Vn. When it is detected that the vehicle 5 is cornering to the left on condition that at least one of the left-hand front wheel 20L and the right-hand rear wheel 21R is slipping, on the other hand, a mean value of the circumferential velocities of the right-hand front wheel 20L and the left-hand rear wheel 21R, both being not slipping, is multiplied by the correction coefficient $\alpha$ 1, producing an estimated vehicle velocity Vn. If both the right-hand front wheel 20R and the left-hand rear wheel 21L are not slipping, on the other hand, when the vehicle 5 is detected to be cornering to the right on condition that the number of the slipping wheel is zero or one, a mean value of the circumferential velocity of the right-hand front wheel 20R and that of the left-hand rear wheel 21L is multiplied by the correction coefficient $\alpha$ 1, thereby producing an estimated vehicle velocity Vn.

When the vehicle 5 is detected to be cornering to the right on condition that at least one of the right-hand front wheel 20R and the left-hand rear wheel 21L is slipping, a mean value of the circumferential velocity of the left-hand front wheel 20L and that of the right-hand rear wheel 21R, both being not slipping, is multiplied with the correction coefficient α 1, thus producing an estimated vehicle velocity Vn.

On condition that two of the wheels were detected to be slipping, a mean value of the circumferential velocity of the left-hand front wheel 20L and that of the right-hand front wheel 20R is multiplied by a correction coefficient α 2 to give an estimated vehicle velocity Vn when neither the left-hand front wheel 20L nor the right-hand front wheel 20R are slipping, or a mean value of the circumferential velocity of the left-hand rear wheel 21L and that of the right-hand rear wheel 21R is multiplied by the correction coefficient α 2 to give an estimated vehicle velocity Vn when neither the left-hand rear wheel 21L nor the right-hand rear wheel 21R are slipping. When nor the left-hand front wheel 20L nor the left-hand rear wheel 21L are slipping or when nor the right-hand front wheel 20R nor the right-hand rear wheel 21R are slipping, an estimated vehicle velocity Vn is calculated by multiplying the circumferential velocity of the wheel of the non-slipping wheels, which is closer to a locus of points of the gravitational center, by the correction coefficient α 2. More specifically, when neither the left-hand front wheel 20L nor the left-hand rear wheel 21L are slipping, on the one hand, the circumferential velocity of the left-hand front wheel 20L is multiplied by the correction coefficient α 2 if the vehicle 5 is cornering to the right and the circumferential velocity of the left-hand rear wheel 21L is multiplied by the correction coefficient α 2 if the vehicle 5 is cornering to the left. When neither the right-hand front wheel 20R nor the right-hand rear wheel 21R are slipping, on the other hand, the circumferential velocity of the right-hand front wheel 20R is multiplied by the correction coefficient α 2 is the vehicle 5 is cornering to the right and the circumferential velocity of the right-hand rear wheel 21R is multiplied by the correction coefficient α 2 if the vehicle 5 is cornering to the left. In each case, the estimated vehicle velocity Vn is given.

When neither the left-hand front wheel 20L nor the right-hand rear wheel 21R are slipping, an estimated vehicle velocity Vn is computed by multiplying a mean value of the circumferential velocity of the left-hand front wheel 20R and that of the right-hand rear wheel 21R by the correction coefficient α 2. When neither the right-hand front wheel 20R nor the left-hand rear wheel 21L are slipping, an estimated vehicle velocity Vn is computed by multiplying a mean value of the circumferential velocity of the right-hand front wheel 20R and that of the left-hand rear wheel 21L by the correction coefficient α2.

If it is detected that three of the wheels are slipping, an estimated vehicle velocity Vn is computed by multiplying the circumferential velocity of the rest of the wheels that is not slipping by a correction coefficient α3.

If it is detected that all the wheels 20L, 20R, 21L and 21R are slipping, the estimated vehicle value Vn that was computed immediately before this detection is set as an estimated vehicle velocity Vn at that time.

It is noted herein that it is desired to set the correction coefficients α1, α2 and α3 so as to have the following relationship: $1 > α1 > α2 > α3$, with the fact taken into consideration that the vehicle 5 becomes unstabler as the number of the wheels which are not slipping increases.

By setting the estimated vehicle velocity under a mode in the determination of the slipping wheel or wheels out of the four wheels and in the setting in accordance with the number of the slipping wheel or wheels, the estimated vehicle velocity can be set with a relatively simplified structure in which no expensive vehicle velocity sensor to ground and so on are used, without a great deviation from an actual vehicle velocity yet with an actual running state of the vehicle 5.

As the estimated vehicle velocity is set in the mode as have been described hereinabove, the control unit 100 functions to implement the slip control against the slipping wheel or wheels under a predetermined control mode in accordance with a combination of the number of the slipping wheels with the number of two wheels or more out of the four wheels of the vehicle 5.

SLIP CONTROL

In the slip control by the control unit 100, the brake unit 30 is constructed so as to selectively enable a brake control applying a braking force to each of the left-hand front wheel 20L, right-hand front wheel 20R, left-hand rear wheel 21L, and right-hand rear wheel 21R, and a throttle control reducing output of the engine by decreasing an opening angle of the throttle valve 14, in accordance with a combination of the number of the wheels slipping with two wheels or more out of the wheels of the vehicle 5. At the same time, a target slip ratio TGBR in the slip control is set to TG1 that is the smallest of predetermined three values TG1 to TG3 (i.e., $0 < TG1 < TG2 < TG3$), inclusive, and a target slip ratio TGTR in the throttle control is set to either one of values TG1 to TG3, inclusive.

In carrying out the brake control and the throttle control, actual slip ratios of the wheels are computed using the estimated vehicle velocities Vn as have been computed hereinbefore.

An actual slip ratio SFL of the left-hand front wheel 20L may be computed as follows:

$$SFL = (VFLn - Vn)/VFLn$$

An actual slip ratio SFR of the right-hand front wheel 20R may be computed as follows:

$$SFR = (VFRn - Vn)/VFRn$$

An actual slip ratio SRL of the left-hand rear wheel 21L may be computed as follows:

$$SRL = (VRLn - Vn)/VRLn$$

An actual slip ratio SRR of the right-hand rear wheel 21R may be computed as follows:

$$SRR = (VRRn - Vn)/VRRn.$$

In the above formulas, n is a positive integer, and VFLn, VFRn, VRLn and VRRn denote circumferential velocities of the respective left-hand front wheel 20L, right-hand front wheel 20R, left-hand rear wheel 21L, and right-hand rear wheel 21R.

When the brake control is executed, driving signals Ca to Ch, inclusive, are selectively formed by the control unit 100 on the basis of a comparison of the actual slip ratios SFL, SFR, SRL and SRR with the value TG1 of the target slip ratio TGBR and the driving signals are accordingly fed to the electromagnetic valves 51 to 58, inclusive, thereby adjusting braking liquid pressures to the disk brakes 35A to 35D mounted, respectively, to the left-hand and right-hand front wheels 20L and 20R and the left-hand and right-hand rear wheels 21L and 21R and controlling the slip ratio of the slipping wheel so as to comply with the value TG1 (feedback control).

In the throttle control, a signal Ct for driving the throttle valve 14 is formed by the control unit 100 on the basis of a comparison of the actual slip ratios SFL, SFR, SRL and SRR with a target slip ratio TGTR set by a selection from either of the value TG1, TG2 or TG3, and the signal Ct is fed to the throttle actuator 13 to adjust the opening angle of the throttle valve 14 and to control the slip ratio of the slipping wheel to be commensurate with the value TG1, TG2 or TG3 (feedback control). It is noted, however, that the above throttle control is suspended and the ordinary throttle control is resumed when the throttle valve opening angle becomes larger than an ordinary target throttle opening set in proportion to a pressing amount of the accelerator pedal 66.

As have been described hereinabove, the brake control and the throttle control can be selectively executed in accordance with a combination of the number of the slipping wheel or wheels with the location of the slipping wheel or wheels. It is noted, however, that only the brake control is carried out when only one slipping wheel is detected. When two slipping wheels are detected, the brake control and the throttle control are executed in accordance with one of control modes predetermined for a total number of six combinations of two wheels out of the four wheels. More specifically, only the brake control is carried out when the left-hand rear wheel 21L and the right-hand rear wheel 21R are both slipping. When the left-hand front wheel 20L and the right-hand front wheel 20R are both slipping, the throttle control is conducted wherein the target slip ratio TGTR is set at the value TG3, on top of the brake control, because an impact upon a running stability of the vehicle 5 is apt to become larger than when the left-hand rear wheel 21L and the right-hand rear wheel 21R are both slipping. When the left-hand front wheel 20L and the left-hand rear wheel 21L or when the right-hand front wheel 20R and the right-hand rear wheel 21R are both slipping, there is conducted the throttle control wherein the target slip ratio TGTR is set at the value TG2, on top of the brake control, because it incurs the risk of causing a yawning. When the left-hand front wheel 20L and the right-hand rear wheel 21R are both slipping or when the right-hand front wheel 20R and the left-hand rear wheel 21L are both slipping, only the brake control is carried out.

As have been described hereinabove, when it is detected that two wheels are slipping, only the brake control is carried out by setting slip control modes in accordance with a combination with the slipping wheels when an impact upon a running stability of the vehicle 5 is relatively small so that torque for driving the wheels is not reduced in an amount more than necessary by reducing output of the engine and a reduction in driving characteristics required for a four-wheel drive vehicle, such as accelerability, drivability on rough roads and so on can be controlled. When an impact upon a running stability of the vehicle 5 is likely to become larger, the throttle control is also carried out in addition to the brake control so that there can be effectively avoided a situation as causing a yawning that may adversely affect the running stability of the vehicle 5.

If it is detected that three wheels are slipping and that they are slipping at approximately the same time in an amount beyond a given degree of slippage, only the throttle control wherein the target slip ratio TGTR is set at the value TG2 is carried out because a running state of the vehicle becomes extremely unstable. If the three wheels are not slipping at approximately the same time beyond the given degree of slippage, the throttle control wherein the target slip ratio TGTR is set at the value TG2 is executed on top of the brake control.

If it is detected that all the four wheels are slipping, the brake control is suspended and the throttle control is carried out wherein the target slip ratio TGTR is set to zero to make the throttle valve 14 fully closed. In a state in which the throttle valve 14 is fully closed, in order to judge whether or not each of the four wheels becomes in a substantially slipless state, a summation deviation value $\epsilon$ is judged whether or not to be equal to or smaller than a given value Za. The summation deviation value $\epsilon$ is computed from the circumferential velocities of the wheels and a circumferential mean value VAV. The circumferential mean value VAV is computed as follows:

$$\text{Circumferential Mean Value } VAV = \frac{VFLn + VFRn + VRLn + VRRn}{4}$$

Then, the summation deviation value $\epsilon$ is computed as follows:

$$\epsilon = (VFLn - VAV)^2 + (VFRn - VAV)^2 + (VRLn - VAV)^2 + (VRRn - VAV)^2$$

If the summation deviation value $\epsilon$ is judged to be greater than the given value Za, the four wheels are not in a substantially slipless state so that the fully closed state of the throttle valve 14 is maintained. If it is decided that the summation deviation value $\epsilon$ is equal to or smaller than the value Za, it can be decided that all the four wheels are in a substantially slipless state so that the slip control is resumed.

In resuming the slip control, no brake control is carried out for a given period of time Tx starting from a point of time when the summation deviation value $\epsilon$ reaches a value equal to or smaller than the value Za, and only the throttle control is carried out during that period wherein the target slip ratio TGTR is set at the value TG1. It is to be noted, however, that the throttle control is suspended when the opening angle of the throttle valve 14 becomes greater than an ordinary target throttle opening set in proportion to a pressing amount of the accelerator pedal 66 during the throttle control wherein the target slip ratio TGTR is set at the value TG1 and consequently that an ordinary throttle opening control is started.

As have been described hereinabove, when it is detected that all the four wheels are slipping in an amount on pavement beyond a given value, the brake control is suspended and the throttle valve 14 is maintained in a fully closed state until all the four wheels becomes in a substantially slipless state and output of the engine is reduced rapidly so that a situation affecting a running stability of the vehicle 5 adversely can be avoided and all the four wheels are brought into a substantially slipless state. Accordingly, even if the slipping would be caused on the four wheels in a degree of slippage as large as beyond the given value, it is possible to achieve, in an extremely short period of time, a running state in which the actual vehicle velocity is equal to or approximately equal to the actual velocity. After the four wheels are brought into a substantially slipless state, only the throttle control is executed for the given period of time Tx in the manner as have been described hereinabove in order to control a re-occurrence of slipping in an amount beyond the given value because the opportunity of such a re-occurrence is extremely high for the given period of time Tx. This ensures a running stability of the vehicle 5 immediately after the state in which all the four wheels are brought in a substantially slipless state. The control manners will be briefed by the number of wheel or wheels which are slipping. In the following table, sign "◯" denotes operated and sign "X" denotes non-operated.

| Number of Slipping Wheels | Location or Manner of Slipping Wheels | Brake | Engine |
|---|---|---|---|
| 1 |  | ◯ | X |
| 2 | Left- & Right-hand Rear Wheels | ◯ | X |
|  | Left- & Right-hand Front Wheels | ◯ | ◯ (TG3) |
|  | Left-hand Front Wheel Left-hand Rear Wheel | ◯ | ◯ (TG2) |
|  | Right-hand Front Wheel Right-hand Rear Wheel | ◯ | ◯ (TG2) |
|  | Left-hand Front Wheel Right-hand Rear Wheel | ◯ | X |
|  | Right-hand Front Wheel Left-hand Rear Wheel | ◯ | X |
| 3 | Slip At Approximately The Same Time | X | ◯ (TG2) |
|  | Slip Not At Approximately The Same Time | ◯ | ◯ (TG2) |
| 4 |  | X | Fully Closed |

FLOW CHARTS

The slip control is carried out mainly on the basis of operation of a microcomputer built in the control unit 100, and one of programs for executing the microcomputer will be described with reference of flow charts illustrated in FIGS. 3 to 9.

Figure 3:
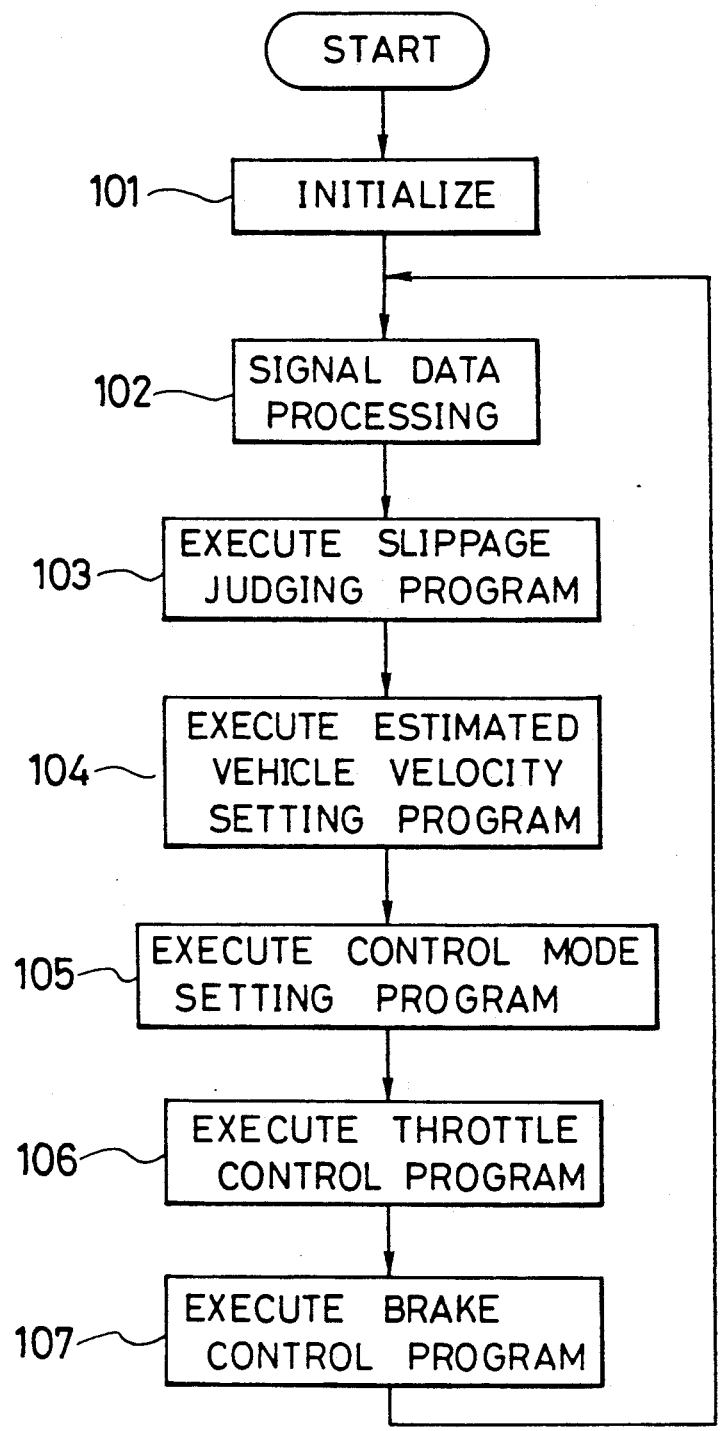
FIGS. 3 to 5, 6(1)–(2), 7(1)–(2), and 8 to 9 are each a flow chart showing one example of programs to be executed by a microcomputer installed in the control unit indicated in FIG. 2.

In a main program illustrated in FIG. 3, initialization was executed at process 101 after the start. At process 102, the signals S1 to S4, inclusive, St, Sa and Sd are inputted and the processing of forming necessary data was executed. Thereafter, various programs are executed in a series of processes ranging from processes 103 to 107, inclusive, and the flow returns to process 102. The series of the processes for executing various programs ranges in the order from process 103 for executing a slippage judging program through process 104 for executing an estimated vehicle velocity setting program, process 105 for executing a control mode setting program and process 106 for executing a throttle control program to process 107 for executing a brake control program.

Figure 4:
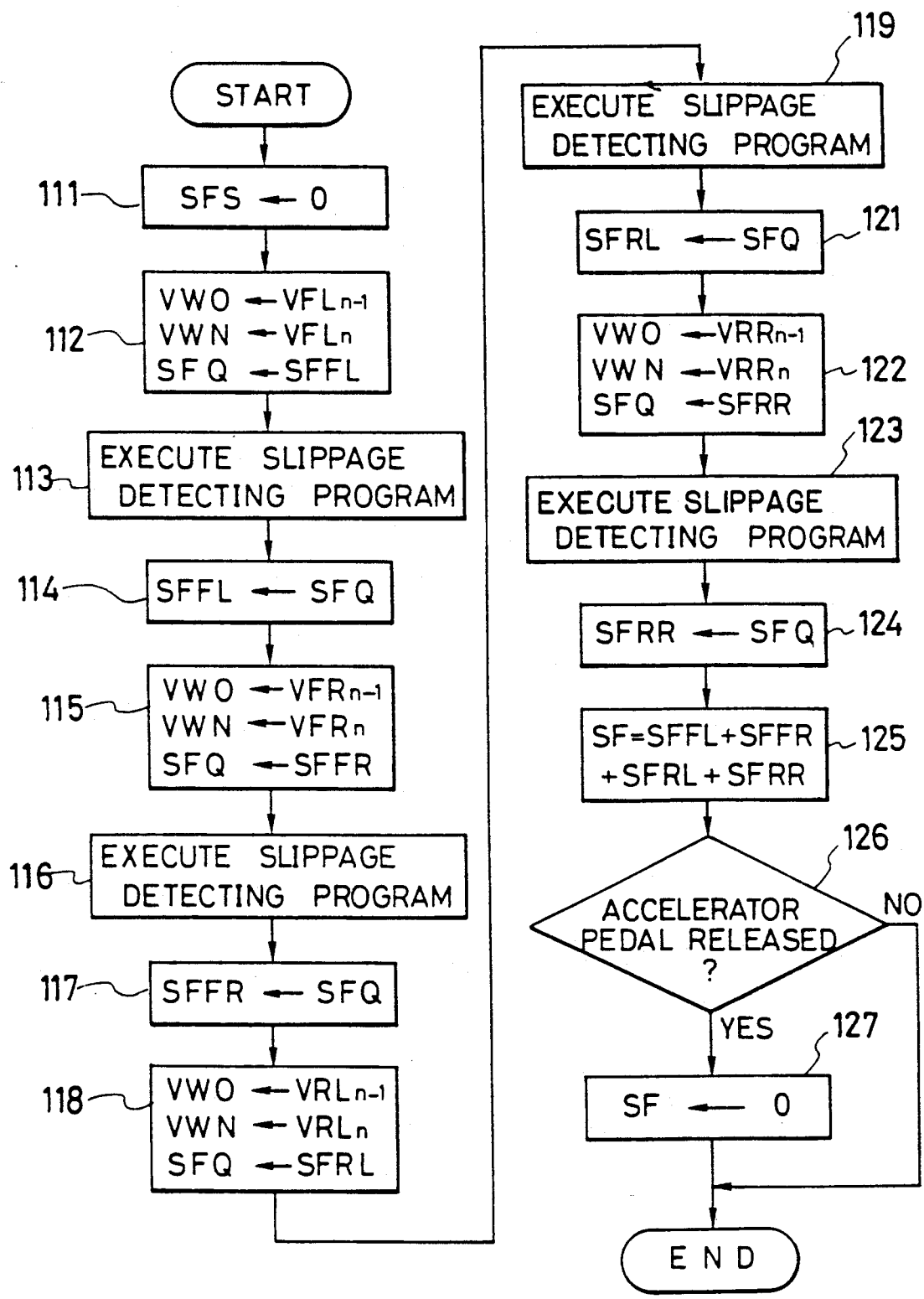

As shown in the flow chart of FIG. 4, the slippage judging program to be executed at process 103 in the flow chart of FIG. 3 is started and, at process 111, a simultaneous slips count flag SFS is set at zero. Then at process 112, the circumferential velocity of the left-hand front wheel 20L one cycle before, VFLn-1, is replaced by value VWO and the circumferential velocity of the left-hand front wheel 20L at that time, VFLn, is replaced by value VWN. At the same time, a slipping wheel judging flag SFQ is replaced by a left-hand front wheel slip flag SFFL. Thereafter at process 113, a slippage detecting program as shown in FIG. 5 is executed.

Figure 5:
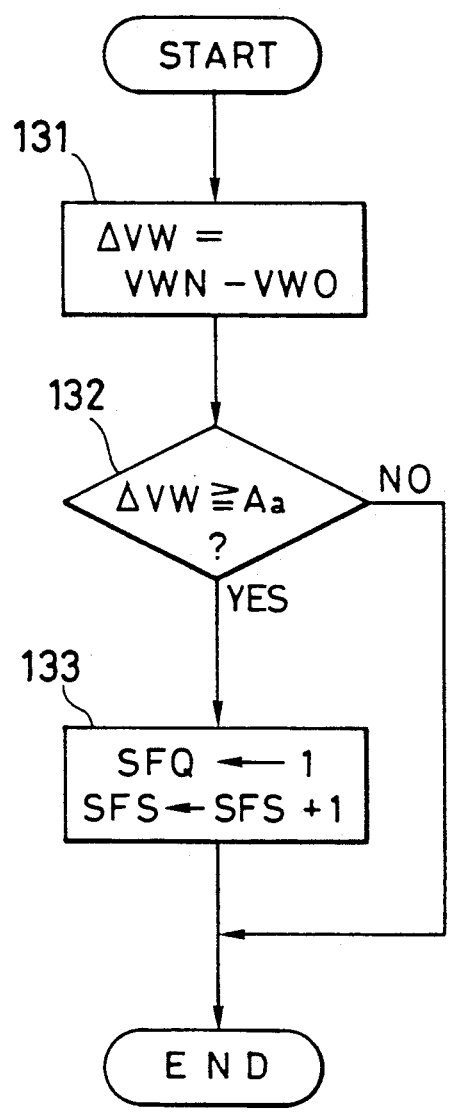

The slippage detecting program as shown in FIG. 5 is started and, at process 131, the circumferential velocity value VWO is subtracted from the circumferential velocity value VWN to give a circumferential acceleration, $\Delta$VW. Then at the following decision 132, it is judged whether or not the circumferential acceleration $\Delta$VW is equal to or greater than a value Aa. If the circumferential acceleration $\Delta$VW is judged to be equal to or greater than the value Aa, it is decided that the left-hand front wheel 20L slips in a degree of slippage beyond the given value and the flow proceeds to process 133 wherein the slipping wheel judging flag SFS is set at 1 and, at the same time, wherein 1 is added to the simultaneous slips count flag SFS to set a new simultaneous slips count flag SFS, thereby concluding this program. If it is decided in decision 132 above that the circumferential acceleration $\Delta$VM is smaller than the value Aa, then the program concludes without passing through process 133. After the end of the program of FIG. 5, the left-hand front wheel slip flag SFFL is replaced by the slipping wheel judging flag SFQ at process 114 in the flow chart of FIG. 4, and the flow then proceeds to process 115.

At process 115, the circumferential velocity of the right-hand front wheel 20R one cycle before, VFRn-1, is replaced by a value VWO, the circumferential velocity of the right-hand front wheel 20R at that time, VFRn, is replaced by a value VWN, and the slipping wheel judging flag SFQ is replaced by a right-hand front wheel slip flag SFFR. Thereafter at process 116, the slippage detecting program as shown in FIG. 5 is executed and, at process 117, the right-hand front wheel slip flag SFFR is then replaced by the slipping wheel judging flag SFQ. The flow then proceeds to process 118 in which the circumferential velocity of the left-hand rear wheel 21L one cycle before, VRLn-1, is replaced by a value VWO, the circumferential velocity of the left-hand rear wheel 21L at that time, VRLn, is replaced by a value VWN, and the slipping wheel judging flag SFQ is replaced by a left-hand rear wheel slip flag SFRL. After the slippage detecting program as shown in FIG. 5 has been executed at process 119, the left-hand rear wheel flag SFRL is replaced by the slipping wheel judging program SFQ at process 120. Then the flow proceeds to process 122 in which the circumferential velocity of the right-hand rear wheel 21R one cycle before, VRRn-1, is replaced by a value VWO, the circumferential velocity of the right-hand rear wheel 21R at that time, VRRn, is replaced by a value VWN, and the slipping wheel judging flag SFQ is replaced by a right-hand rear wheel slip flag SFRR. At process 123, the slippage detecting program as shown in FIG. 5 was executed and, at process 124, the right-hand rear wheel slip flag SFRR is replaced by the slipping wheel judging flag SFQ. Then the flow proceeds to process 125.

At process 125, a slipping wheels count flag SF is set by adding the left-hand front wheel slip flag SFFL, the right-hand front wheel slip flag SFFR, the left-hand rear wheel slip flag SFRL and the right-hand rear wheel slip flag SFRR. Then at decision 126, it is judged whether or not the accelerator pedal 66 is in a released state. If the accelerator pedal 66 is decided to be in a released state, then the flow proceeds to process 127 in which the slipping wheels count flag SF is set to zero, and the program concludes. If it is decided at decision 126 that the accelerator pedal 66 is not in a released state, then the program concludes without passing through process 127.

Figure 6I:
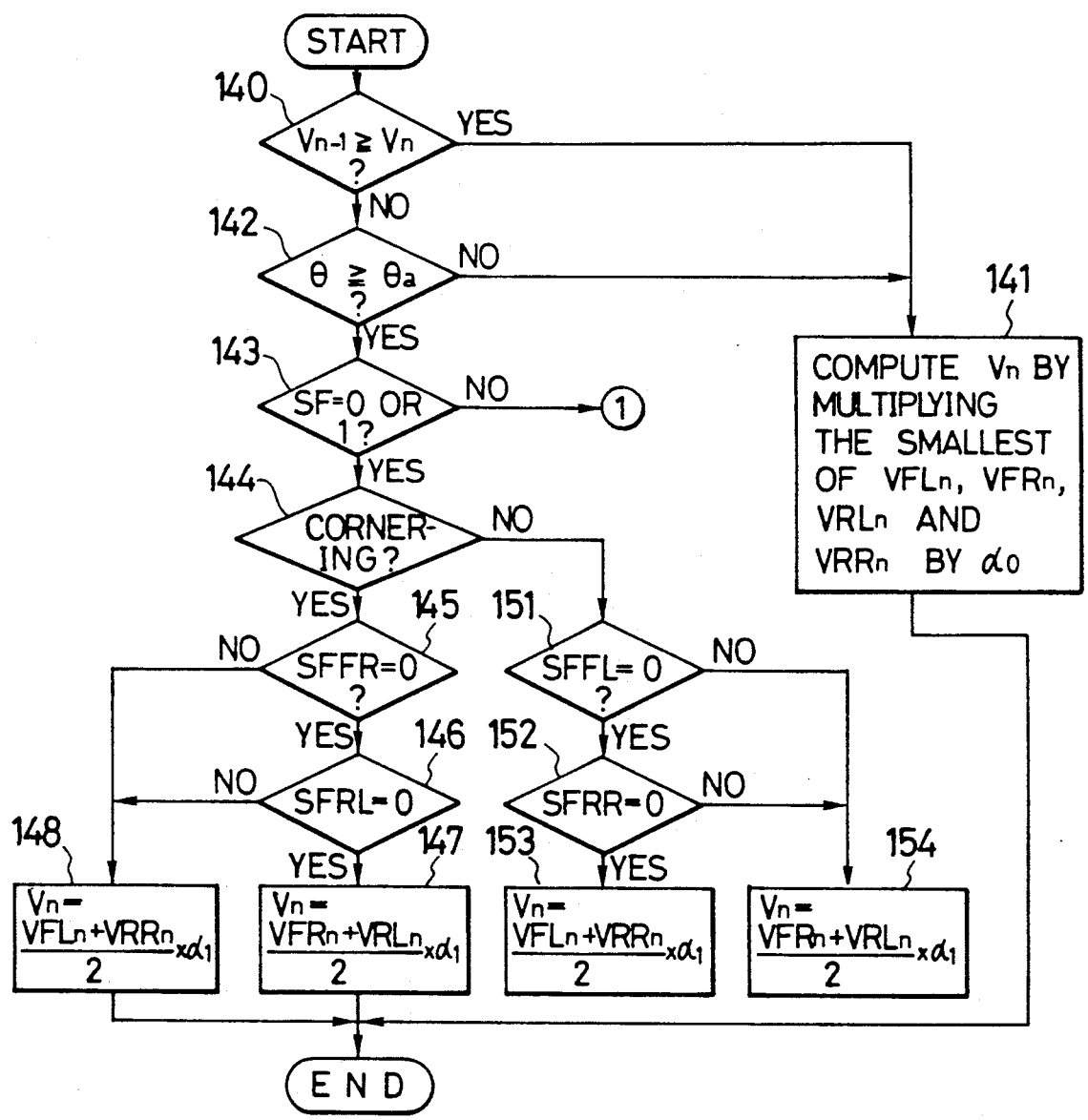

In the estimated vehicle velocity setting program to be executed at process 104 in the flow chart as shown in FIG. 3, as shown in each of the flow charts of FIGS. 6(1)-(2), it is judged at process 140 after the start whether or not the estimated vehicle velocity set one cycle before, $Vn-1$, is equal to or greater than a value Vh. If the estimated vehicle velocity $Vn-1$ is judged to be equal to or greater than the value Vh, the flow proceeds to process 141 in which the estimated vehicle velocity Vn is computed by multiplying the minimum value of the circumferential velocities VFLn, VFRn, VRLn and VRRn, represented respectively by the signals S1 to S4, inclusive, of the respective left-hand front wheel 20L, right-hand front wheel 20R, left-hand rear wheel 21L and right-hand rear wheel 21R by the correction coefficient $\alpha o$. Then the program concludes. If it is judged at decision 141 that the estimated vehicle velocity $Vn-1$ is smaller than the value Vh, it is further judged at process 142 whether or not the steered angle $\theta$ of the left-hand front wheel 20L and the right-hand front wheel 20R, represented by the signal Sd, is equal to or greater than a value $\theta a$. When it is judged at decision 142 that the steered angle $\theta$ is smaller than the value $\theta$, the flow proceeds to the process 141 in which the processing is executed in the same manner as hereinbefore and the program goes to the end. When it is decided at decision 142 that the steered angle $\theta$ is equal to or greater then the value $\theta a$, the flow proceeds to decision 143.

At decision 143, it is judged whether or not the slipping wheels count flag SF is zero or 1. If it is judged that the flag SF is zero or 1, the flow advances to decision 144 and it is judged therein whether or not the vehicle 5 is cornering to the right on the basis of the steered angle $\theta$. When it is judged that the vehicle 5 is cornering to the right, the flow then proceeds to decision 145 in which it is judged whether or not the right-hand front wheel slip flag SFFR is zero. If the right-hand front wheel slip flag SFFR is decided to be zero, the flow proceeds to decision 146 and it is further judged therein whether or not the left-hand rear wheel slip flag SFRL is zero. If YES at decision 146, then at process 147, the estimated vehicle velocity Vn is computed as follows:

$$Vn=\{(VFRn+VRLn)/2\}\times \alpha 1$$

Thereafter the program concludes.

At decisions 145 and 146, it is judged that the right-hand front wheel slip flag SFFR and the left-hand rear wheel slip flag SFRL are not zero, respectively, the flow advances to process 148 in which the estimated vehicle velocity Vn is computed as follows:

$$Vn=\{(VFLn+VRRn)/2\}\times \alpha 1$$

Thereafter this program concludes.

If it is judged at decision 144 that the vehicle 5 is not cornering to the right, the flow proceeds to decision 151 in which it is judged whether or not the left-hand front wheel flag SFFL is zero. When the left-hand front wheel flag SFFL is judged to be zero, it is further judged at decision 152 whether or not the right-hand rear wheel slip flag SFRR is zero. If YES at decision 152, the estimated vehicle velocity Vn is computed at process 153 as follows:

$$Vn=\{(VFLn+VRRn)/2\}\times \alpha 1$$

and then this program concludes.

At decisions 151 and 152, it is judged that the left-hand front wheel slip flag SFFL and the right-hand rear wheel slip flag SFRR are not zero, the flow proceeds in each case to process 154 and the estimated vehicle velocity Vn is computed as follows:

$$Vn=\{(VFRn+VRLn)/2\}\times \alpha 1$$

Thereafter the program concludes.

When, at decision 143, it is judged that the slipping wheels count flag SF is neither zero nor 1, the flow proceeds to decision 155 and it is judged there whether or not the slipping wheels count flag SF is two. If YES, it is then judged at decision 156 whether or not the right-hand front wheel slip flag SFFR is zero. If it is judged that the flag SFFR is not zero, then at decision 157, it is judged whether or not the right-hand rear wheel slip flag SFRR is zero. When the right-hand rear wheel slip flag SFRR is judged to be not zero, then the flow proceeds to decision 158 in which it is further decided whether or not the vehicle 5 is cornering to the right. If YES, then at process 159, the estimated vehicle velocity Vn is computed as follows:

$$Vn=VFLn\times \alpha 2$$

Then the program goes to the end.

When it is judged at decision 158 that the vehicle 5 is not in a rightward cornering state, the estimated vehicle velocity is computed at process 160 as follows:

$$Vn=VRLn\times \alpha 2$$

and the program concludes.

If it is judged at decision 157 that the right-hand rear wheel slip flag SFRR is zero, then the flow goes to decision 161 where it is judged whether or not the left-hand front wheel slip flag SFFL is zero. If YES, the estimated vehicle velocity Vn is computed at process 162 as follows:

$$Vn=\{(VFLn+VRRn)/2\}\times \alpha 2$$

and the program goes to the end. If NO at decision 161, the estimated vehicle velocity Vn is computed at process 163 as follows:

$$Vn=\{(VRRn+VRLn)/2\}\times \alpha 2$$

Thereafter the program concludes.

When it is judged at decision 156 that the right-hand front wheel slip flag SFFR is zero, the flow then proceeds to decision 163 and it is judged therein whether or not the left-hand front wheel slip flag SFFL is zero. If YES, then the estimated vehicle velocity Vn is computed at process 164 as follows:

$$Vn = \{(VFRn + VFLn)/2\} \times a2$$

and the program goes to the end. If NO at decision 163, it is further judged at decision 165 whether or not the left-hand rear wheel slip flag SFRL is zero. If it is decided therein that the left-hand rear wheel slip flag SFRL is zero, then the flow proceeds to process 166 in which the estimated vehicle velocity Vn is computed as follows:

$$Vn = \{(VFRn + VRLn)/2\} \times a2$$

and the program concludes. If it is decided at decision 165, then it is further judged at decision 167 whether or not the vehicle 5 is cornering to the right. If NO at decision 167, the flow then proceeds to process 168 and the estimated vehicle velocity Vn is computed as follows:

$$Vn = VRRn \times a2$$

Thereafter this programs goes to the end. When it is decided at decision 167 that the vehicle 5 is cornering to the right, the flow then proceeds to process 169 in which the estimated vehicle velocity Vn is computed as follows:

$$Vn = VFRn \times a2$$

and the program concludes.

Referring back to process 155, when it is judged therein that the slipping wheels count flag SF is not 2, then the flow goes to decision 171 and it is judged therein whether or not the slipping wheels count flag SF is 3. If YES at decision 171, it is further decided at decision 172 whether or not the right-hand front wheel slip flag SFFR is zero. If YES at decision 172, then the flow proceeds to process 173 and the estimated vehicle velocity is computed therein as follows:

$$Vn = VFRn \times a3$$

When it is judged at decision 172 that the right-hand front wheel slip flag SFFR is not zero, the flow goes to decision 174 wherein it is further decided whether or not the left-hand front wheel slip flag SFFL is zero. If YES at decision 174, then at process 175, the estimated vehicle velocity Vn is computed as follows:

$$Vn = VFLn \times a3$$

and the program goes to the end. When it is decided at decision 174 that the left-hand front wheel slip flag SFFL is not zero, then the flow goes to decision 176 in which it is further decided whether or not the right-hand rear wheel slip flag SFRR is zero. If YES at decision 176, then the flow goes to process 177 and the estimated vehicle velocity Vn is computed as follows:

$$Vn = VRRn \times a3$$

and the program concludes. If NO at decision 176, then at process 178, the estimated vehicle velocity Vn is computed as follows:

$$Vn = VRLn \times a3$$

and the program goes to the end.

Turning back to decision 171, when it is decided that the slipping wheels count flag SF is not three, this program then concludes.

Figure 7I:
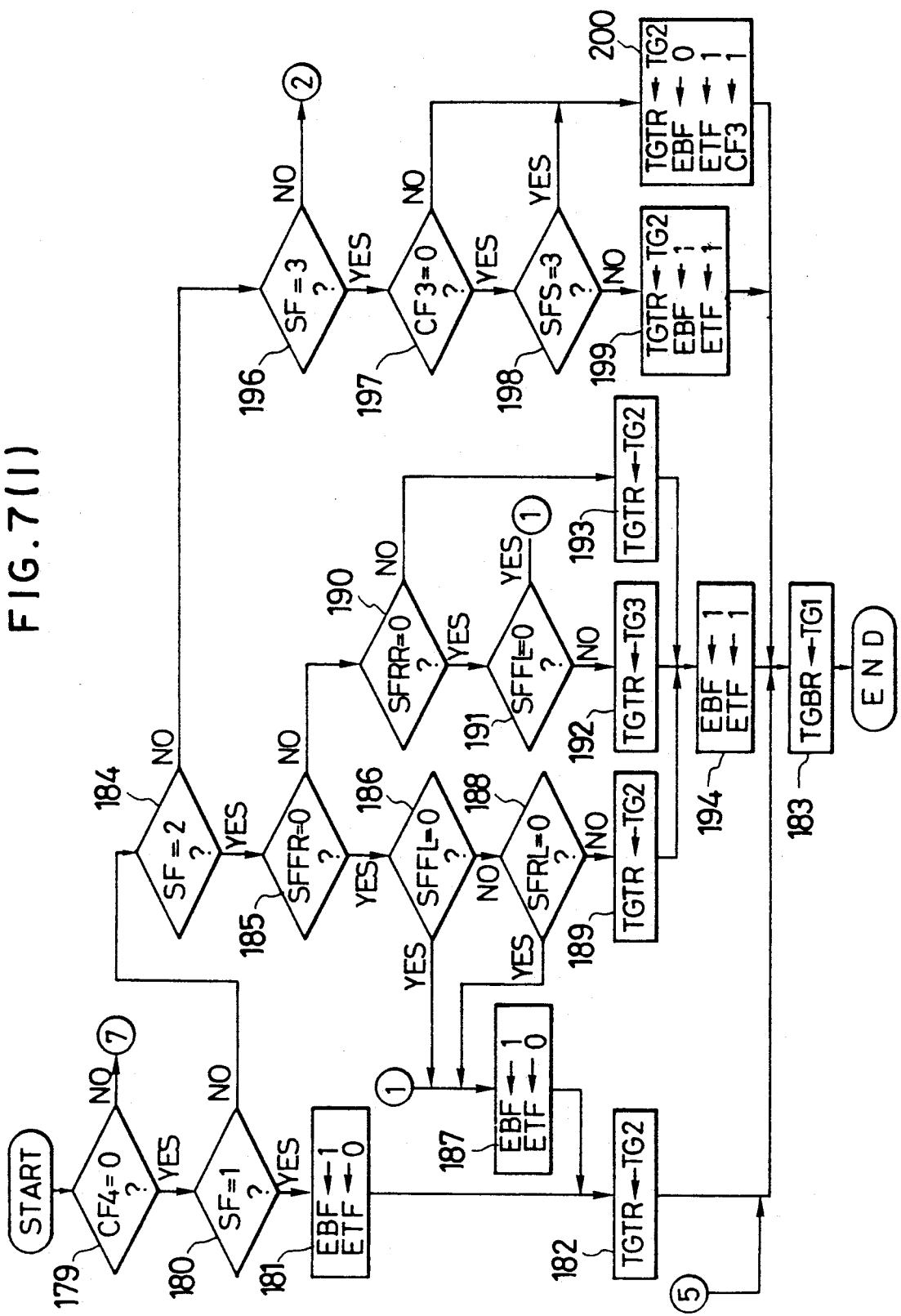
Figure 7:
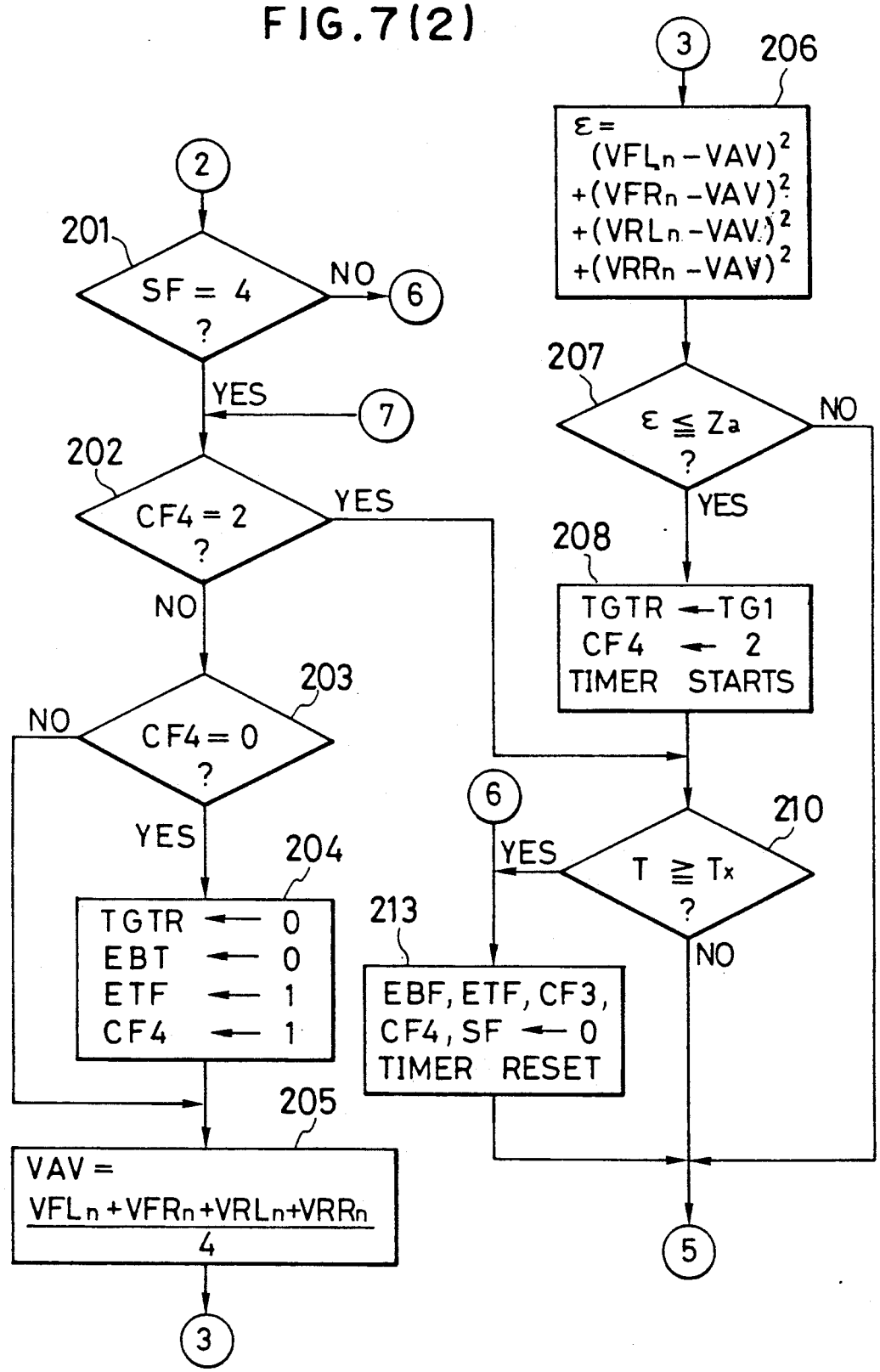

As shown in each of the flow chart of FIG. 7(1)-(2) the control mode setting program to be executed at process 105 in the flow chart of FIG. 3 is started and, at process 179, it is first decided whether or not a four-wheel slip control flag CF4 is zero which represents an ordinary state. If YES at decision 179, then at decision 180, it is further decided whether or not the slipping wheels count flag SF is 1. If it is decided that the flag SF is 1, then the flow goes to process 181 in which a brake control execution flage EBF is set to 1 and a throttle control execution flag ETF is set to zero. Then at process 182, a target slip ratio TGTR for the throttle control is set to value TG2 and, at process 183, a target slip ratio TGBR for the brake control is set to value TG1. The program then goes to the end.

At decision 180, when it is decided that the slipping wheels count flat SF is not one, the the flow goes to decision 184 and it is further decided whether or not the slipping wheels count flag SF is two. If YES at decision 184, then at decision 185, it is judged whether or not the right-hand front wheel slip flang SFFR is zero. When it is decided that the flag SFFR is zero, the flow then advances to decision 186 wherein it is further judged whether or not the left-hand front wheel slip flag SFFL is zero. If YES at decision 186, then the flow proceeds to process 187 in which the brake control execution flage EBF is set to 1 and the throttle control execution flag ETF is set to zero because the left-hand rear wheel 21L and the right-hand rear wheel 21R are both slipping in an amount beyond a given degree of slippage on pavement. Then at processes 182 and 183, the processing is executed in the same manner as hereinbefore and this program goes to the end.

At decision 186, when it is decided that the left-hand front wheel slip flag SFFL is not zero, the flow then goes to decision 188 it is judged therein whether or not the left-hand rear wheel slip flag SFRL is zero. If it is decided that the flag SFRL is not zero, the flow then goes to process 189 where the target slip ratio TGTR is set to value TG2 because it is decided that the left-hand front wheel 20L and the left-hand rear wheel 21L are slipping in a degree of slippage greater than the given value, and the flow then proceeds to process 194. At decision 185, when it is decided that the right-hand front wheel slip flag SFFR is not zero, then the flow goes to decision 190 and it is further judged whether or not the right-hand rear wheel slip flag SFRR is zero. When it is decided at decision 190 that the flag SFRR is zero, then at decision 191, it is furthermore judged whether or not the left-hand front wheel slip flag SFFL is zero. When it is decided at decision 191 that the flag SFFL is not zero, the flow proceeds to process 192 where the target slip ratio TGTR is set to value TG3 because it is decided that the left-hand front wheel 20L and the right-hand front wheel 20R are both slipping in an amount exceeding the given degree of slippage on pavement. Then the flow goes to process 194. When it is decided at decision 190 that the right-hand rear wheel slip flag SFRR is not zero, it means that the right-hand front wheel 20R and the right-hand near wheel 21R are both slipping in a degree of slippage above the given value so that the flow advances to process 193 when the target slip ratio TGTR is set to value TG2 and further to process 194. At process 194, the brake control execution program EBF and the throttle control execution program ETF are both set to one and, at process 183 which follows, the target slip ratio TGBR is set to value TG1 and then the program concludes. Furthermore, when it is decided that both the left-hand front wheel 20L and the right-hand rear wheel 21R are slipping in a degree of slippage greater than the given value when the left-hand rear wheel slip flag SFRL is decided to be zero at decision 188 and when it is decided that both the right-hand front wheel 20R and the left-hand rear wheel 21L are slipping in a degree of slippage greater than the given value when it is judged at decision 191 that the left-hand front wheel slip flag SFFL is zero, the flow proceeds to process 187 and the processing of process 187 and processes which follow is executed in the order until the program concludes.

Referring back to decision 184, when it is decided that the slipping wheels count flag SF is not two, then the flow goes to decision 196 where it is further judged whether or not the slipping wheels count flag SF is three. When it is decided at decision 196 that the flag SF is 3, then at decision 197, it is further judged whether or not a three-wheel simultaneous slip occurence flag CF3 is zero. If YES at decision 197, then the flow goes to decision 198 in which it is further decided whether or not the simultaneous slip count flag SFS is three. When it is decided that the flag SFS is not three, then at process 199, the target slip ratio TGTR is set to value TG2 while both the brake control execution flag EBF and the throttle control execution flag ETF are set to one. Then at process 183, the target slip ratio TGBR is set to value TG1 and the program concludes. When the flag CF3 is decided at decision 197 to be not zero and when the flag SFS is decided at decision 198 to be three, then flow goes to process 200 where the target slip ratio TGTR is set to value TG2, the brake control execution flag EBF is set to 0, and the throttle control execution flag ETF is set to 1 while the three-wheel simultaneous slip occurrence flag CF3 is set to 1. Then at process 183, the processing is executed in the same manner as hereinbefore and then the program goes to the end.

Referring back to decision 196, when it is decided that the slipping wheels count flag SF is not three, the flow proceeds to decision 201 and it is then judged whether or not the flag SF is four. If YES, then the flow goes to decision 202. When it is decided at decision 179 that the flag CF4 is not zero, too, the flow goes to decision 202. At decision 202, it is further judged whether or not the four-wheel slip control flag CF4 is two which means that a slippage is converging. If the flag CF4 is not two, then at decision 203, it is further judged whether or not the four-wheel slip control flag CF4 is zero which represents that the vehicle is in an ordinary running state. When it is decided at decision 203 that the flag CF4 is zero, then at process 204, both the target slip ratio TGTR and the brake control execution flag EBF are set to zero as well as both the throttle control execution flag ETF and the four-wheel slip control flag CF4 are all set to one. The four-wheel slip control flag CF4 being one means that a slippage is in a converging state. Then the flow goes to process 205. When it is decided at decisioin 203 that the flag CF4 is not zero, the flow proceeds to process 205, too.

At process 205, a circumferential-velocity mean value VAV is computed by dividing a total sum of the circumferential velocities VFLn, VFRn, VRLn and VRRn of the respective left-hand and right-hand, front and rear wheels 20L, 20R, 21L and 21R by four. Then at process 206 which follows, a summation deviation value $\epsilon$ is computed as follows:

$$\epsilon = (VFLn - VAV)^2 + (VFRn - VAV)^2 + (VRLn - VAV)^2 + (VRRn - VAV)^2$$

The flow then goes to decision 207 where it is judged whether the summation deviation value $\epsilon$ is equal to or smaller than a given value Za. When NO at decision 207, then the flow advances to process 183 and the processing is executed in the same manner as hereinbefore followed by the end of the program. When it is decided at decision 207 that the summation deviation value $\epsilon$ is equal to or smaller than the given value Za, the target slip ratio TGTR is set to value TG1 and the four-wheel slip control flag CF4 is set to 2, followed by the start of a built-in timer to measure a period of time T. Then the flow goes to decision 210. When it is decided at decision 202 that the flag CF4 is two, the flow proceeds to decision 210, too. Then at decision 210, the period of time T is judged whether or not to be equal to or longer than a given period of time Tx. When it is decided that the given period of time Tx does not yet elapse, then the flow proceeds to process 183 and the processing is executed in the same manner has hereinbefore followed by the end of the program. When it is decided at decision 210 that the given period of time Tx has elapsed, then at process 213, the brake control execution flag EBF, the throttle control execution flag ETF, the three-wheel simultaneous slip occurrence flag CF3, the four-wheel slip control flag CF4, and the slipping wheels count flag SF are set all to zero as well as the built-in timer is reset. Then the flow goes to process 183 where the processing is executed in the same manner as hereinbefore and the program goes to the end. Referring back to decision 201, when it is decided that the slipping wheels count flag SF is not four, the flow then goes to process 213 and then to process 183, in which the processing is executed in the same manner as hereinbefore, followed by the end of the program.

Figure 8:
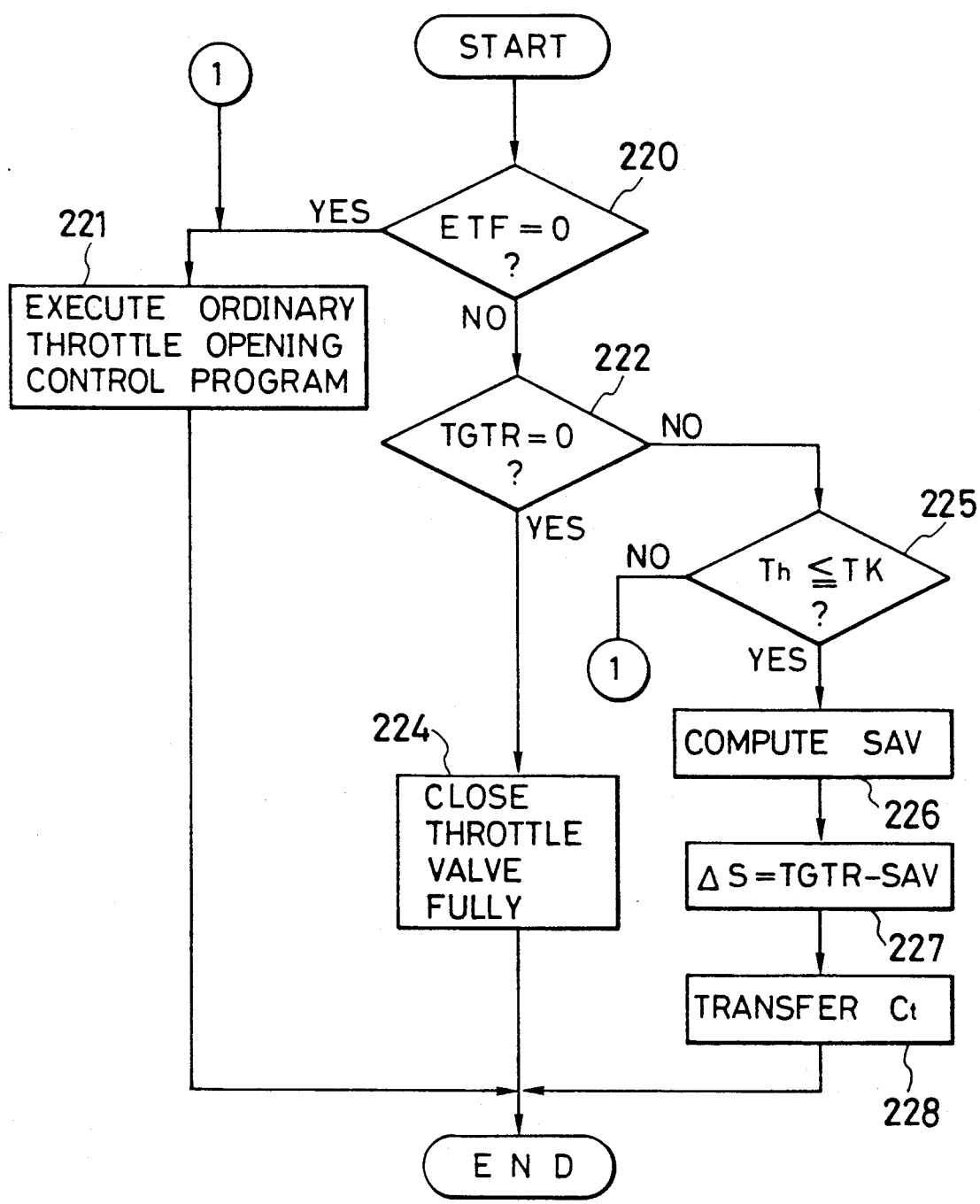

Turning now to FIG. 8, the throttle control program execution at process 106 in the flow chart of FIG. 3 will be described. After start, it is first judged at decision 220 whether the throttle control execution flag ETF is zero or not. If YES, the flow goes to process 221 where an ordinary throttle opening angle control program is executed and the program goes to the end. When it is decided at decision 220 that the flag ETF is not zero, then at decision 222, it is further judged whether or not the target slip ratio TGTR is zero. If YES at decision 222, the flow goes to process 224 where a signal CT for driving the throttle valve 14 to full close is sent to the throttle actuator 13, and this program concludes. At decision 222, when it is decided that the target slip ratio TGTR is not zero, it is then decided at decision 225 whether or not an opening angle of the throttle valve 14, Th, is equal to or smaller than an ordinary target throttle opening angle TK set in accordance with a pressing amount of the accelerator pedal 66. If NO at decision 225, the flow goes to process 221 where the ordinary throttle opening control program is executed in the same manner as hereinabove and the program then concludes. At decision 225, when the opening angle Th of the throttle valve 14 is decided to be equal to or smaller than the ordinary target throttle opening angle TK, then the flow goes to process 226 where there is computed, using the estimated vehicle velocity Vn, a mean slip ratio SAV on pavement of the wheels, which are slipping in a degree of slippage exceeding the given valve, out of the left-hand and right-hand, front and rear wheels 20L, 20R, 21L and 21R. Then at process 227, a difference ΔS is computed by subtracting the mean slip ratio SAV from the target slip ratio TGTR and, at process 228, a driving signal Ct for driving the throttle valve 14 in accordance with the difference ΔS is formed in order to bring the mean slip ratio SAV into agreement with the target slip ratio TGTR, then generating the signal Ct to the throttle actuator 13 followed by the end of the program.

Figure 9:
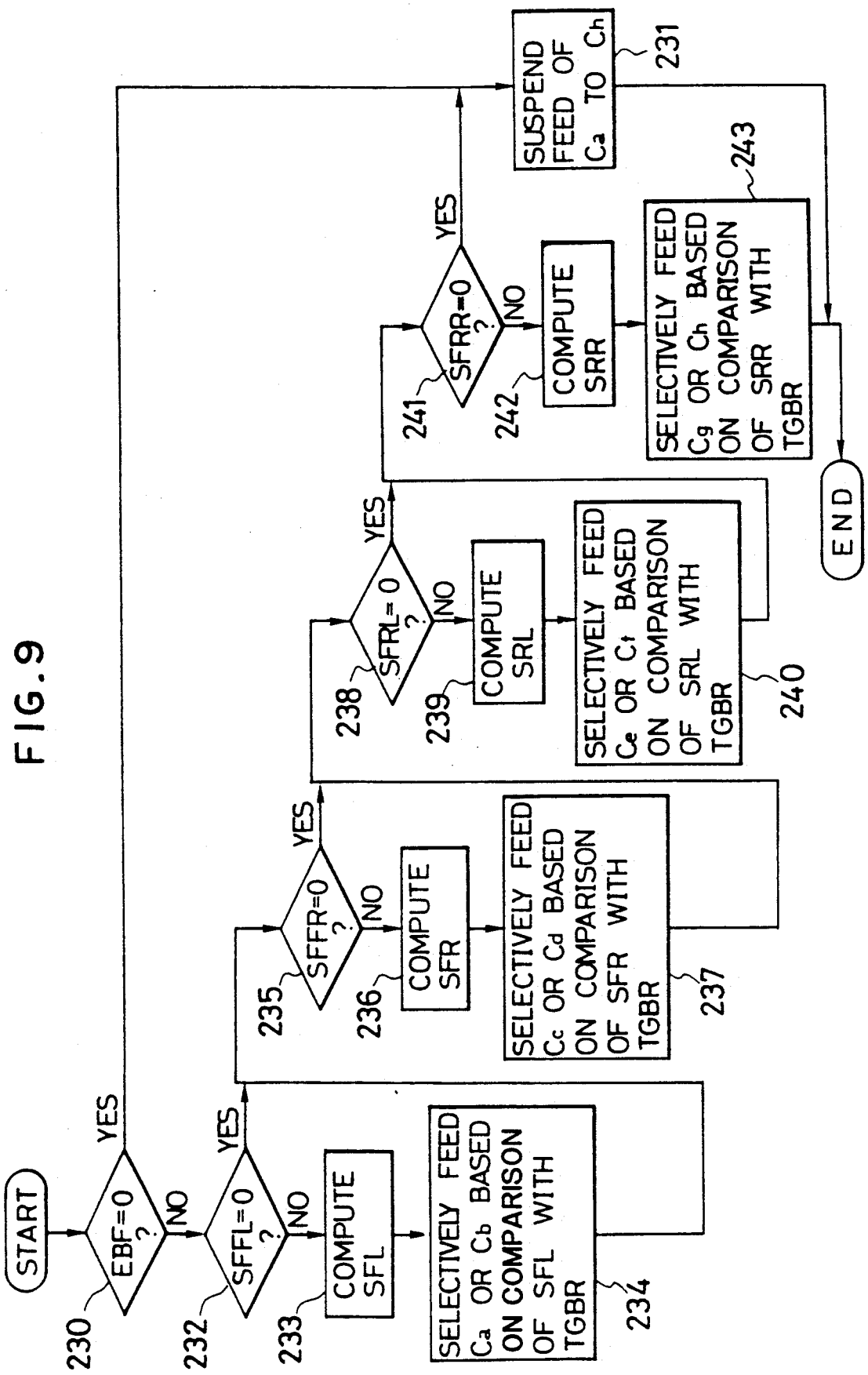

As shown in FIG. 9, the brake control program execution at process 107 in the flow chart of FIG. 3 is started and, at decision 230, it is judged whether the brake control execution flag EBF is zero. If YES, the flow goes to process 231 and the feeding of the signals Ca to Ch is suspended to bring the disk brakes 35A to 35D into a released state followed by the end of the program. If it is decided at decision 230 that the brake control execution flag EBF is not zero, then at decision 232, it is further judged whether or not the left-hand front wheel slip flag SFFL is zero. If NO at decision 232, the flow goes to process 233 where an actual slip ratio SFL of the left-hand front wheel 20L is computed using the estimated vehicle velocity Vn as follows:

$$SFL = (VFLn - Vn)/VFLn$$

Then at process 234, driving signals Ca and Cb are selectively sent to the electromagnetic valves 51 and 52 on the basis of a comparison of the actual slip ratio SFL with the target slip ratio TGBR in order to bring the actual slip ratio SFL into comformity with the target slip ratio TGBR and then the flow goes to decision 235. When it is decided at decision 232 that the left-hand front wheel slip flag SFFL is zero, the flow also goes to decision 235.

At decision 235, it is further judged whether the right-hand front wheel slip flag SFFR is zero. If NO at decision 235, the flow goes to process 236 where an actual slip ratio SFR of the right-hand front wheel 20R is computed using the estimated vehicle velocity Vn as follows:

$$SFR = (VFRn - Vn)/VFRn$$

Then at process 237, driving signals Cc and Cd are selectively sent to the electromagnetic valves 53 and 54 on the basis of a comparison of the actual slip ratio SFR with the target slip ratio TGBR in order to bring the actual slip ratio SFR into comformity with the target slip ratio TGBR and then the flow goes to decision 238. When it is decided at decision 235 that the left-hand front wheel slip flag SFFR is zero, the flow also goes to decision 238.

At decision 238, the left-hand rear wheel SFRL is judged whether or not to be zero. If NO, then at process 239, an actual slip ratio SRL of the left-hand rear wheel 21L is computed on the basis of the estimated vehicle velocity Vn as follows:

$$SRL = (VRLn - Vn)/VRLn$$

and, at process 240, driving signals Ce and Cf are sent selectively to the electromagnetic valves 55 and 56 on the basis of a comparison of the actual slip ratio SRL with the target slip ratio TGBR. The flow then goes to decision 241. Also, when it is decided at decision 238 that the left-hand rear wheel slip flag SFRL is zero, then the flow goes to decision 241.

At decision 241, it is further judged whether or not the right-hand rear wheel slip flag SFRR is zero. If NO at decision 241, then at process 242, an actual slip ratio SRR of the right-hand rear wheel 21R is computed from the estimated vehicle velocity Vn as follows:

$$SRR = (VRRn - Vn)/VRRn$$

Then the flow proceeds to process 243 and the driving signals Cg and Ch are selectively sent to the electromagnetic valves 57 and 58 on the basis of the actual slip ratio SRR and the target slip ratio TGBR in order to comply the actual slip ratio SRR with the target slip ratio TGBR., and the program goes to the end. When it is decided at decision 241 that the right-hand rear wheel slip flag SFRR is zero, the processing is executed at process 231 in the same manner as hereinbefore and then the program concludes.

The above description has been made by way of examples in which two of the wheels are slipping. Control modes are divided by a combination of the slipping wheels into a first control mode in which the slip control is carried out be means of the brake control only and a second control mode in which the slip control is carried out by means of the throttle control on top of the brake control. In particular, the second control mode is further broken down in different modes in which different target slip ratios are given, when te slipping wheels likely to adversely affect a running stability against the vehicle are a pair of the front and rear wheels on the left side or on the right side or a pair of the left-hand and right-hand rear wheels on the rear side or when the other two wheels are slipping. It is noted, however, that the slip control apparatus for the four wheel drive vehicle according to the present invention does not necessarily required such control manners and that it may be constructed, for instance, such that the brake control and the throttle control can be simultaneously carried out when a target slip ratio for the brake control is set at the same ratio as for the throttle control, whereby the slip control may be carried out in control modes in which a ratio of a reduced torque portion acting on the slipping wheels reduced by the brake control to reduced torque portion acting thereon reduced by the throttle control may vary with a combination of the two slipping wheels. It should be noted herein as a matter of course that this may be applicable to examples other than cases where the slipping wheels are other than those have been described immediately hereinabove.

It is also to be noted that although, in the above examples, output of the engine during the slip control can be adjusted by changing an opening angle of the throttle valve, such is not necessarily required and that it may also be adjusted by means of a air-fuel ratio, an ignition timing, an amount of exhaust gases to be circled, a timing of opening and closing air intake and/or exhaust valves, pressures to be charged, and fuel injection timing, on place of the opening angle of the throttle valve.

It is further to be noted that, although the above examples are directed to a four wheel drive vehicle of a full time type which is driven always in a four-wheel drive state, the present invention may be applicable to a part-time type four wheel drive vehicle adapted to selectively take a four-wheel drive state and a two-wheel drive state.

Although this invention has been shown and described with respect to plural embodiments thereof, it should be understood that various changes and omissions in the form and details of the invention may be made therein without departing from the spirit and the scope of the invention.

What is claimed is:

1. A slip control apparatus for a four wheel drive vehicle in which each of wheels consisting of left-hand front and right-hand front wheels and left-hand and right-hand rear wheels is driven, comprising:
   slippage detecting means for detecting a slippage amount on pavement for each of the wheels;
   brake means for applying a braking force individually to each of the wheels;
   output adjusting means for adjusting output of an engine for driving the wheels;
   judgment means for judging a combination of two slipping wheels out of four wheels, which are detected by the slippage detecting means as slipping in a degree of slippage above a given value; and
   control means for reducing torque for driving the two slipping wheels in accordance with one of control modes on the basis of a judgment result by the judgment means, a control mode being preset so as to operate which means out of the brake means and the output adjusting means in association with the combination of the two slipping wheels.

2. A slip control apparatus as claimed in claim 1, wherein the control means is to operate only the brake means when the two slipping wheels are a pair of the left-hand and right-hand rear wheels.

3. A slip control apparatus as claimed in claim 1, wherein the control means is to operate both the brake means and the output adjusting means when the two slipping wheels are a pair of the left-hand and right-hand front wheels.

4. A slip control apparatus as claimed in claim 1, wherein the control means is to operate both the brake means and the output adjusting means when the two slipping wheels are a pair of the left-hand front wheel and the left-hand rear wheel.

5. A slip control apparatus as claimed in claim 1, wherein the control means is to operate both the brake means and the output adjusting means when the two slipping wheels are a pair of the right-hand front wheel and the right-hand rear wheel.

6. A slip control apparatus as claimed in claim 1, wherein the control means is to operate only the brake means when the two slipping wheels are a pair of the left-hand front wheel and the right-hand rear wheel.

7. A slip control apparatus as claimed in claim 1, wherein the control means is to operate only the brake means when the two slipping wheels are a pair of the right-hand front wheel and the left-hand rear wheel.

8. A slip control apparatus as claimed in claim 1, wherein the control means is to selectively carry out a first control mode in which only the brake control is executed or a second control mode in which both the brake means and the output adjusting means are executed.

9. A slip control apparatus as claimed in claim 8, wherein the control means is to subject the brake means to feedback control to make a slip value of each of the two slipping wheels a given target slip value.

10. A slip control apparatus as claimed in claim 8, wherein the control means is to subject the output adjusting means to feedback control to make a mean value of slip values of the two slipping wheels a given target slip value when the control means is in the second control mode.

11. A slip control apparatus as claimed in claim 8, wherein the control means is to subject the brake means to feedback control to make a slip value of each of the two slipping wheels a given first target slip value and to subject the output adjusting means to feedback control to make a mean value of the two slipping wheels a second given target value, when the control means is in the second control mode.

12. A slip control apparatus as claimed in claim 11, wherein the first target slip value is set smaller than the second target slip value.

13. A slip control apparatus as claimed in claim 11, wherein the two slipping wheels are controlled in the first control mode when the two slipping wheels are a pair of the left-hand and right-hand rear wheels or a pair of the left-hand front wheel and the right-hand rear wheel or a pair of the right-hand front wheel and the left-hand rear wheel; or
   the two slipping wheels are controlled in the second control mode when the two slipping wheels are a pair of the left-hand and right-hand front wheel or a pair of the left-hand front wheel and the left-hand rear wheel or a pair of the right-hand front wheel and the right-hand rear wheel.

14. A slip control apparatus as claimed in claim 13, wherein the second target slip value when the two slipping wheels are a pair of the left-hand and right-hand front wheels is set larger than the second target slip value when the two slipping wheels are a pair of the left-hand front wheel and the left-hand rear wheel or a pair of the right-hand front wheel and the right-hand rear wheel.

15. A slip control apparatus as claimed in claim 1, wherein the slippage detecting means is to decide a wheel which is slipping in a degree of slippage greater than the given value by judging whether or not acceleration computed on the basis of a circumferential velocity, of the wheel is greater than a given value.

16. A slip control apparatus as claimed in claim 1, wherein the control means is to reduce torque for driving the slipping wheel in accordance with one of control modes wherein which one of the brake means and the output adjusting means to be operated is predetermined in accordance with the number of slipping wheels when the number of the slipping wheels detected by the slippage detecting means to be slipping in a degree of slippage greater than the given value is other than two.

17. A slip control apparatus as claimed in claim 16, wherein the control means reduces torque for driving the slipping wheel by operating only the brake means when only one wheel is slipping in a degree above the give value.

18. A slip control apparatus as claimed in claim 16, wherein the control means is to reduce torque for driving the slipping wheel by operating only the output adjusting means when the number of the slipping wheels which are slipping at approximately the same time in a degree of slippage greater than the given value is three.

19. A slip control apparatus as claimed in claim 16, wherein the control means is to reduce torque for driving the slipping wheel by operating both the brake means and the output adjusting means when the number of the slipping wheels are three and the slipping wheels are not slipping at approximately the same time.

20. A slip control apparatus as claimed in claim 16, wherein the output adjusting means is operated to make its engine output minimum without operation of the brake means when the number of the slipping wheels slipping in a degree of slippage greater than the given value is four.

21. A slip control apparatus as claimed in claim 20, wherein the control means selectively controls the output adjusting means to a state in which an engine output becomes minimum or to a state in which an engine output is elevated, on the basis of a magnitude of a value determined by a mean circumferential velocity, of the four slipping wheels and a circumferential velocity, of each of the four slipping wheels, a magnitude being set to a given threshold value, when the four slipping wheels are slipping in a degree of slippage greater than the given value.

22. A slip control apparatus as claimed in claim 1, wherein the output adjusting means is a throttle valve for adjusting an amount of intake air to the engine.

23. A slip control apparatus as claimed in claim 1, wherein the slippage detecting means comprises:
    wheel velocity detecting means for detecting an individual circumferential velocity of each of the wheels;
    vehicle velocity estimating means for estimating a vehicle velocity on the basis of a circumferential velocity of one or more given wheels to be selected under a predetermined condition out of a circumferential velocity of each of the wheels detected by the wheel velocity detecting means; and
    slip value determining means for determining a slip value of each of the wheels from an estimated vehicle velocity estimated by the vehicle velocity estimating means and the circumferential velocity of each of the wheels.

24. A slip control apparatus as claimed in claim 23, wherein the predetermined condition for estimating the vehicle velocity is set in accordance with an estimated vehicle velocity previously estimated by the vehicle velocity estimating means, a steered angle of a steering wheel, and the number of slipping wheels which are detected as slipping in a degree of slippage greater than the given value.

25. A slip control apparatus as claimed in claim 23, wherein the predetermined condition for estimating the vehicle velocity is set in accordance with the estimated vehicle velocity previously estimated by the vehicle velocity estimating means.

26. A slip control apparatus as claimed in claim 23, wherein the vehicle velocity estimating means estimates a current vehicle velocity on the basis of a circumferential velocity which is the least out of circumferential velocities of the wheels during high speed running when the estimated vehicle velocity previously estimated by the vehicle velocity estimating means is equal to or greater than a given value.

27. A slip control apparatus as claimed in claim 23, wherein the vehicle velocity estimating means estimates a current vehicle velocity on the basis of a circumferential velocity which is the least one of circumferential velocities of the wheels during low speed running or during non-cornering, when the estimated vehicle velocity previously estimated by the vehicle velocity estimating means is smaller than a given value.

28. A slip control apparatus as claimed in claim 23, wherein the predetermined condition for estimating the vehicle velocity is set in accordance with the number of slipping wheels which are detected to be slipping in a degree of slippage greater than given value.

29. A slip control apparatus for a four wheel drive vehicle in which each of wheels consisting of left-hand front and right-hand front wheels and left-hand and right-hand rear wheels is driven, comprising:
    slippage detecting means for detecting a magnitude of slippage on pavement for each of the wheels, which is greater than a given degree of slippage;
    brake means for applying a braking force individually to each of the wheels;
    output adjusting means for adjusting output of an engine for driving the wheels; and
    control means for reducing a driving torque acting upon a slipping wheel on the basis of one of control modes predetermined so as to operate the brake means or the output adjusting means in accordance with the number of the slipping wheel or wheels which is or are detected by the slippage detecting means as slipping in a degree of slippage greater than the given value.

30. A slip control apparatus as claimed in claim 29, wherein the control means is to selectively carry out a first control mode in which only the brake control is executed or a second control mode in which both the brake means and the output adjusting means are executed.

* * * * *